(12) United States Patent
Fink et al.

(10) Patent No.: US 10,509,186 B2
(45) Date of Patent: Dec. 17, 2019

(54) THERMALLY-DRAWN FIBER INCLUDING DEVICES

(71) Applicant: Massachusetts Institute of Technology, Cambridge, MA (US)

(72) Inventors: Yoel Fink, Brookline, MA (US); Michael Rein, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/661,426

(22) Filed: Jul. 27, 2017

(65) Prior Publication Data
US 2018/0039036 A1 Feb. 8, 2018

Related U.S. Application Data

(60) Provisional application No. 62/367,690, filed on Jul. 28, 2016.

(51) Int. Cl.
*G02B 6/44* (2006.01)
*F21S 4/10* (2016.01)
(Continued)

(52) U.S. Cl.
CPC .............. *G02B 6/4416* (2013.01); *F21S 4/10* (2016.01); *F21S 4/15* (2016.01); *F21V 23/001* (2013.01); *G02B 6/02033* (2013.01); *G02B 6/4479* (2013.01); *H01B 1/023* (2013.01); *H01B 1/026* (2013.01); *H01B 3/30* (2013.01); *H01B 5/16* (2013.01); *A41D 1/005* (2013.01); *F21Y 2103/30* (2016.08); *F21Y 2115/10* (2016.08)

(58) Field of Classification Search
USPC ......................................................... 362/225
See application file for complete search history.

(56) References Cited

U.S. PATENT DOCUMENTS 4,234,907 A 11/1980 Daniel
4,515,432 A 5/1985 Sherwin
(Continued)

OTHER PUBLICATIONS

PCT/US2017/044127, International Search Report, Form PCT/ISA/210 First Sheet, Continuation of First Sheet, Second Sheet, Continuation of Second Sheet, Extra Sheet, Nov. 2017.
(Continued)

*Primary Examiner* — Matthew Mikels
(74) *Attorney, Agent, or Firm* — Theresa Lober

(57) ABSTRACT

There is provided herein a fiber including a fiber body with a fiber body material having a longitudinal axis along a fiber body length. A plurality of devices is disposed as a linear sequence of devices within the fiber body. Each device includes at least one electrical contact pad. At least one electrical conductor is disposed within the fiber body. The electrical conductor is electrically connected to an electrical contact pad of devices in the plurality of devices. A weavable device includes at least one device material arranged in a planar device configuration and connected to an electrical contact pad. An electrically insulating, mechanically flexible fiber body material encapsulates the planar device configuration and contact pad and has a fiber body length greater than 10 m. An electrical conductor is electrically connected to a device contact pad and extends the fiber body length.

38 Claims, 9 Drawing Sheets

(51) Int. Cl.
*F21S 4/15* (2016.01)
*F21V 23/00* (2015.01)
*G02B 6/02* (2006.01)
*H01B 1/02* (2006.01)
*H01B 3/30* (2006.01)
*H01B 5/16* (2006.01)
*F21Y 103/30* (2016.01)
*F21Y 115/10* (2016.01)
*A41D 1/00* (2018.01)

(56) References Cited

U.S. PATENT DOCUMENTS

| | | | |
|---|---|---|---|
| 5,546,413 | A | 8/1996 | Lebby et al. |
| 5,906,004 | A | 5/1999 | Lebby et al. |
| 6,228,228 | B1 | 5/2001 | Singh et al. |
| 6,560,398 | B1 | 5/2003 | Roach et al. |
| 7,292,758 | B2 | 11/2007 | Bayindir et al. |
| 7,295,734 | B2 | 11/2007 | Bayindir et al. |
| 7,567,740 | B2 | 7/2009 | Bayindir et al. |
| 7,805,029 | B2 | 9/2010 | Bayindir et al. |
| 8,098,966 | B2 | 1/2012 | Bayindir et al. |
| 8,541,940 | B2 | 9/2013 | Moran-Mirabal et al. |
| 9,263,614 | B2 | 2/2016 | Deng et al. |
| 9,365,013 | B2 | 6/2016 | Fink et al. |
| 9,373,807 | B2 | 6/2016 | Pan et al. |
| 9,512,036 | B2 | 12/2016 | Abouraddy et al. |
| 2003/0075210 | A1* | 4/2003 | Stollwerck ........ B32B 17/10009 136/243 |
| 2005/0018975 | A1 | 1/2005 | Ho et al. |
| 2005/0227059 | A1 | 10/2005 | Granstrom et al. |
| 2007/0053637 | A1 | 3/2007 | Golwalkar et al. |
| 2008/0227349 | A1 | 9/2008 | Eyck et al. |
| 2014/0212084 | A1 | 7/2014 | Gumennik et al. |
| 2015/0044463 | A1 | 2/2015 | Fink et al. |
| 2015/0276506 | A1 | 10/2015 | Djeu |
| 2015/0357078 | A1 | 12/2015 | Lessing et al. |
| 2016/0028102 | A1 | 1/2016 | Bae et al. |
| 2016/0155534 | A1 | 6/2016 | Fink et al. |
| 2016/0233399 | A1* | 8/2016 | Maki .................. H01L 25/0753 |
| 2018/0017248 | A1 | 1/2018 | Athauda et al. |
| 2018/0023801 | A1 | 1/2018 | Athauda et al. |
| 2018/0141274 | A1 | 5/2018 | Fink et al. |

OTHER PUBLICATIONS

PCT/US2017/044127, Written Opinion of the International Searching Authority, Form PCT/ISA/237 Cover Sheet, Box No. 1, Box No. IV, Box No. V, Supplemental Box 7 sheets, Nov. 2017.

Rein et al., "Self-assembled fibre optoelectronics with discrete translational symmetry," Nature Communications, 7:12807, pp. 1-8, Oct. 2016.

* cited by examiner

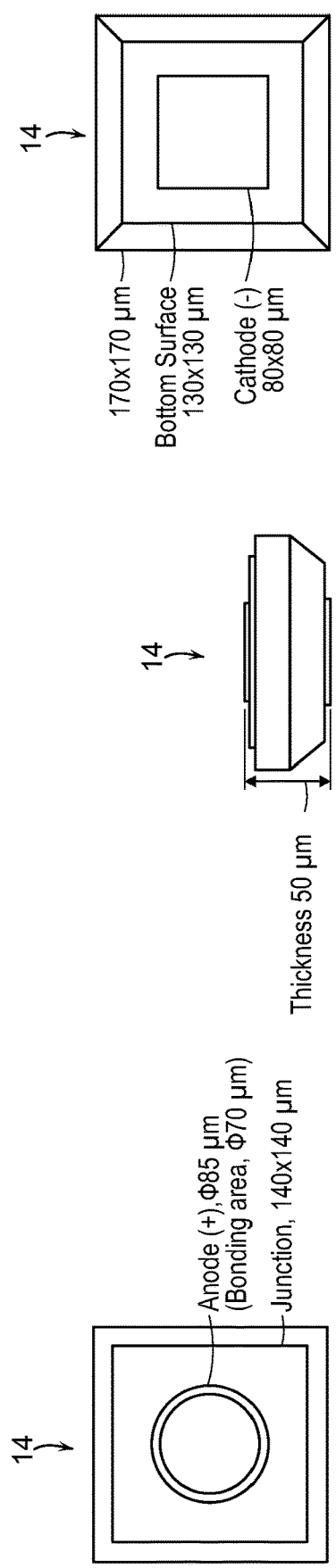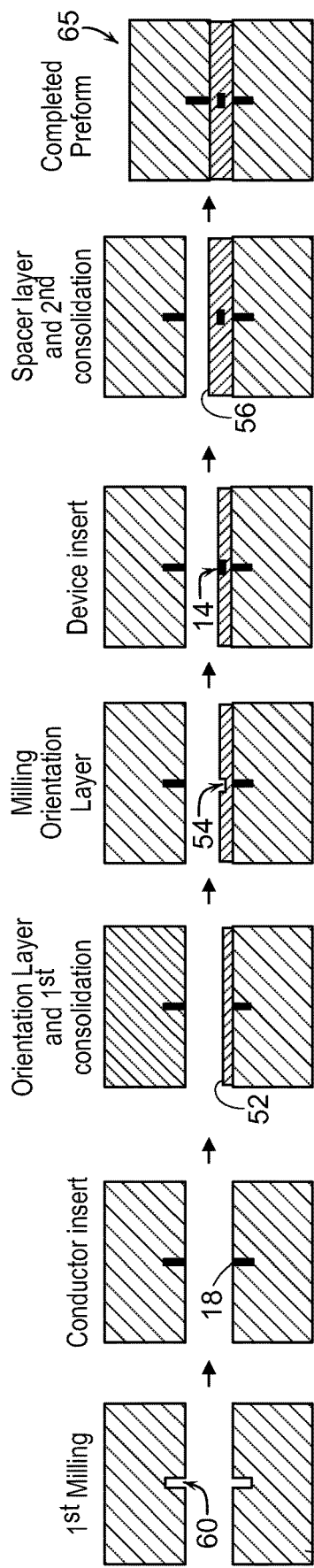

THERMALLY-DRAWN FIBER INCLUDING DEVICES

CROSS-REFERENCE TO RELATED APPLICATION

This application claims the benefit of U.S. Provisional Patent Application No. 62/367,690, filed Jul. 28, 2016, the entirety of which is hereby incorporated by reference.

STATEMENT REGARDING FEDERALLY SPONSORED RESEARCH

This invention was made with Government support under Contract No. DMR-1419807, awarded by the National Science Foundation, and under Contract No. W911NF-13-D-0001, awarded by the United States Army Research Office. The Government has certain rights in the invention.

BACKGROUND

This invention relates generally to fibers, and more particularly relates to fiber-based microelectronic devices.

The field of wearable electronics has recently received substantial attention as a possible platform for connection between humans and flexible electronic devices. So-called 'wearable' devices are now available, but are separate and distinct from wearable fabric because the devices cannot be incorporated into a fabric production process, generally due to the non-fiber form of the devices. Yet fibers and yarns are the main building blocks of textiles.

Optical fiber is the main building block of modern communication systems. There has been demonstrated the ability to produce multifunctional optical fibers by combining different sets of materials to achieve corresponding fiber functions. Additionally, here has been demonstrated the use of optical fiber as a platform for supporting external devices, e.g., as a carrier for microelectronic devices that are positioned on the surface of the fiber.

The thermal drawing of optical fiber is a powerful and well established process that enables the production of a wide range of fiber geometries. But thermal drawing imposes limits on the functionality of the drawn fiber. For example, the set of materials that can be thermally drawn into a fiber is limited by the thermomechanical properties of the materials. Conventionally, in order to achieve a successful fiber draw, all fiber materials to be co-drawn must flow at the same temperature, requiring the materials to have similar viscosities while maintaining chemical compatibility with each other at the draw temperature. As the draw temperature is lowered, the set of materials that can be integrated into the fiber is increasingly limited. As the draw temperature is increased, diffusion and mixing of and undesired chemical reaction between drawn materials increases, often prohibiting the use of materials that are required to achieve desired fiber structure and/or functionality.

The materials employed in conventional, commercial microelectronic devices are not in general compatible for co-drawing into fiber form because such devices require a large set of materials, including crystalline semiconductors, high melting temperature alloys, thin films, and thermoset polymers, and these in general are not compatible for co-drawing. For example, light emitting diodes typically include at least two doped semiconductor materials as well as metallization materials, which are not in general compatible for thermal co-drawing. As a result of these material limitations, as well as fabrication requirements for microscale dimensional control imposed by microelectronic devices, the full integration of devices, such as microelectronic devices, into fiber-based textiles has not historically been achievable.

SUMMARY

There is provided herein a fiber that includes a fiber body with a fiber body material and having a longitudinal axis along a fiber body length. A plurality of devices is disposed as a linear sequence of devices within the fiber body along at least a portion of the fiber body length. Each device includes at least one electrical contact pad. At least one electrical conductor is disposed within the fiber body along at least a portion of the fiber body length. The electrical conductor is electrically connected to an electrical contact pad of devices in the plurality of devices within the fiber body.

In a corresponding fiber preform there is provided a first region of fiber body material and a second region of fiber body material. A plurality of operational devices is disposed as a linear sequence of devices between the first region of fiber body material and the second region of fiber body material. Each device includes at least one electrical contact pad. At least one continuous groove is in at least one of the first region of fiber body material and the second region of fiber body material. This continuous groove is aligned with the linear sequence of devices for orienting an electrical conductor with the linear sequence of devices.

In a method for forming such a fiber, a preform is assembled including a first region of fiber body material and a second region of fiber body material. A plurality of operational devices is disposed as a linear sequence of devices between the first region of fiber body material and the second region of fiber body material. Each device includes at least one electrical contact pad. At least one continuous groove is provided in at least one of the first region of fiber body material and the second region of fiber body material, the continuous groove being aligned with the linear sequence of devices for orienting an electrical conductor with the linear sequence of devices. Electrically conducting wire is fed into the continuous grooves in the preform, and the preform is thermally drawn into a fiber.

This enables a fabric that includes a plurality of fibers woven together in an arrangement of a selected fabric weave pattern. At least a portion of the plurality of fibers consist of device fibers. Each device fiber includes a fiber body with a fiber body material and having a longitudinal axis along a fiber body length. A plurality of devices is disposed as a linear sequence of devices within the fiber body along at least a portion of the fiber body length. Each device includes at least one electrical contact pad. At least one electrical conductor is disposed within the fiber body along at least a portion of the fiber body length. The electrical conductor is electrically connected to an electrical contact pad of devices in the plurality of devices within the fiber body.

This further enables a weavable electronic device. The weavable devices includes at least one device material, selected from the group of an electronic material and a photonic material, that is arranged in a planar device configuration. At least one electrical contact pad is connected to the device material. An electrically insulating, mechanically flexible fiber body material encapsulates the planar device configuration and contact pad and has a fiber body length greater than about 10 m. At least one electrical conductor is electrically connected to a device contact pad and extends the fiber body length. The fiber body material encapsulates the electrical conductor while maintaining electrical connection between the electrical conductor and the device contact pad.

The structures and methodology provided herein enable independently functional, fully fabricated microelectronic devices such as LEDs, detectors, transistors, and other devices, including commercially-available microelectronic and optoelectronic devices, to be included in a thermally drawn fiber. Any devices in a wide range of micro-scale electronics, such as LEDs and photodiodes, or other micro-scale devices, e.g., having cross sections on order of 100 microns, which are conventionally available commercially, can be included in the fiber. The fiber paradigm provided herein provides an ability to exploit in a fiber the benefits of high performance devices without the need to fabricate the devices from fiber materials themselves. Thus, the fiber formation paradigm provided herein combines the benefits of several technologies, namely, high-efficiency, high-performance device microfabrication technology and well-controlled, fiber drawing technology, to produce kilometer-long fibers that can be woven into highly functional fabrics, textiles, and other fiber arrangements for a wide range of communication and sensing applications.

Further features and advantages will be apparent from the following description and accompanying drawings, and from the claims.

BRIEF DESCRIPTION OF THE DRAWINGS

FIGS. 4A-4C are a top view, a side view, and a bottom view, respectively, of a commercial LED that can be employed as a device in the fiber of FIG. 1A;

FIGS. 5A-5G are cross-sectional side views showing a sequence of steps for assembling the components in the preform of FIG. 3;

DETAILED DESCRIPTION

Figure 1A:
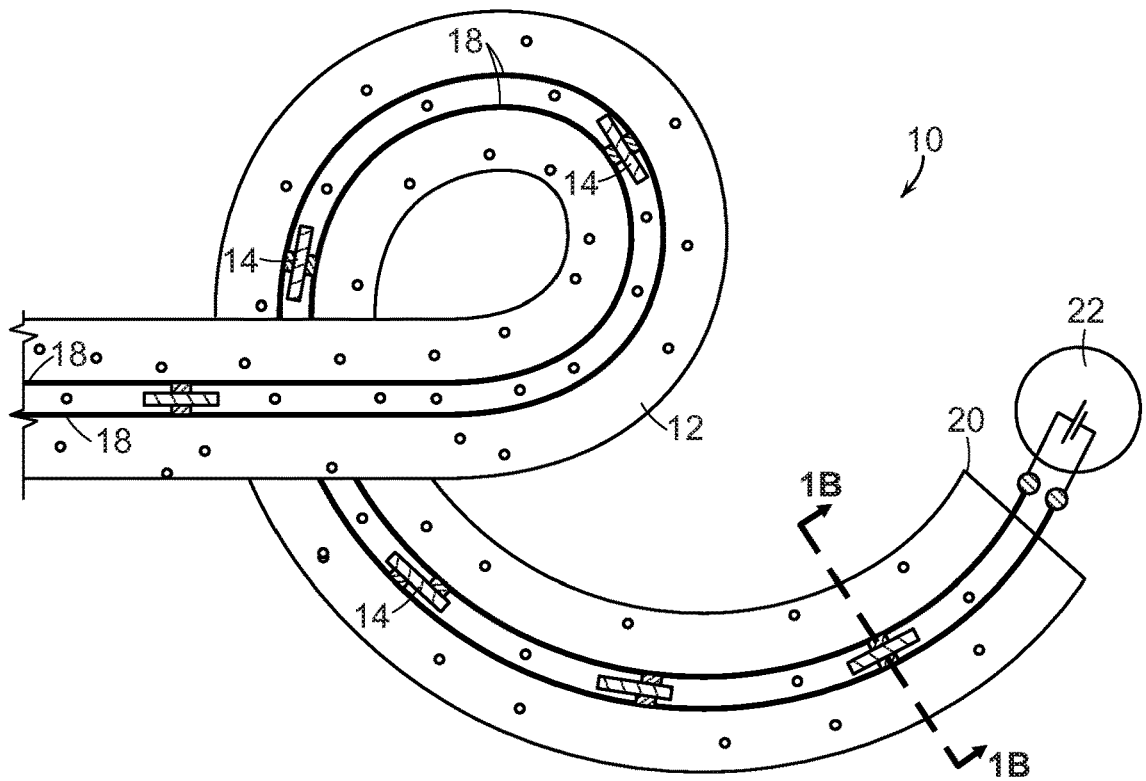
FIG. 1A is a schematic side view of a length of fiber including devices that are sited along the fiber length and that are electrically connected to conducting wires by device contact pads.
Figure 1B:
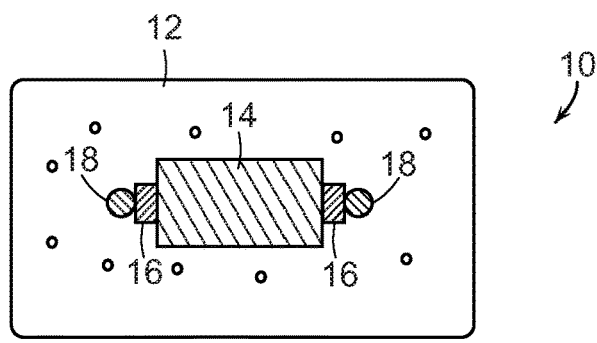
FIG. 1B is a cross-sectional view of the fiber of FIG. 1A taken at cross-section 1B-1B in FIG. 1A.

Referring to FIGS. 1A-1B, a section of a fiber 10 as-provided herein is shown in side-view and in cross-sectional view, respectively; the fiber is not shown to scale in these figures for clarity of detail. The fiber 10 includes a fiber body 12 within which are disposed devices 14, such as microelectronic devices or photonic devices, at sites along the fiber body 12. The devices are arranged in a linear sequence, i.e., single file, along at least a portion of the fiber body length. There is a space between adjacent devices along the device sequence. Each device 14 can be a planar device and oriented, e.g., so that the physical plane of the device is parallel to the longitudinal axis of the fiber body, defined here as the long axis of the fiber body. Each device 14 is provided with electrical contact pads 16 for making one or more electrical connections to the device.

Electrical conductors 18 are disposed within the fiber body 12 along at least a portion of the fiber length in contact with device contact pads 16. At one or both ends 20 of the fiber 10, one or more of the conductors 18 are connected to a power supply 22 or other circuitry for operation of the devices in the fiber 10. This configuration is advantageous for enabling an arrangement of electrodes along the wire length for making electrical connection to the devices.

Figure 1C:
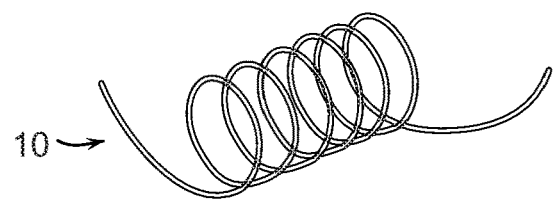
FIG. 1C is a schematic perspective view of an extended length of the fiber of FIG. 1A.

Referring also to FIG. 1C, the fiber 10 is an elongated, macroscopic structure for which the longitudinal dimension is substantially larger than the other two fiber dimensions, defined as the fiber cross-sectional dimensions. The body length, l, of the fiber is on the order of meters, e.g., 10 m, 20 m, 50 m, 100 m, or longer, while the largest cross sectional extent of the fiber is on the order of millimeters, resulting in a fiber longitudinal-to-cross-sectional ratio that can be above 1000. The fiber cross-section is shown in FIG. 1B as generally rectangular, but such is not required. Any suitable cross-sectional fiber geometry, e.g., circular, elliptical, rectangular, triangular, or other cross-sectional geometry, can be employed. The fiber body 12 is mechanically flexible and is not fixedly rigid. In contrast, the devices 14 disposed at sites along the fiber body length are mechanically rigid structures held within the flexible fiber body. Even with the rigid devices sited along at least a portion of the fiber length, or along substantially the entire fiber length, the fiber and the materials of the fiber body maintain significant mechanical flexibility; the fiber is sufficiently flexible, e.g., to be coiled around a spool.

Figure 2:
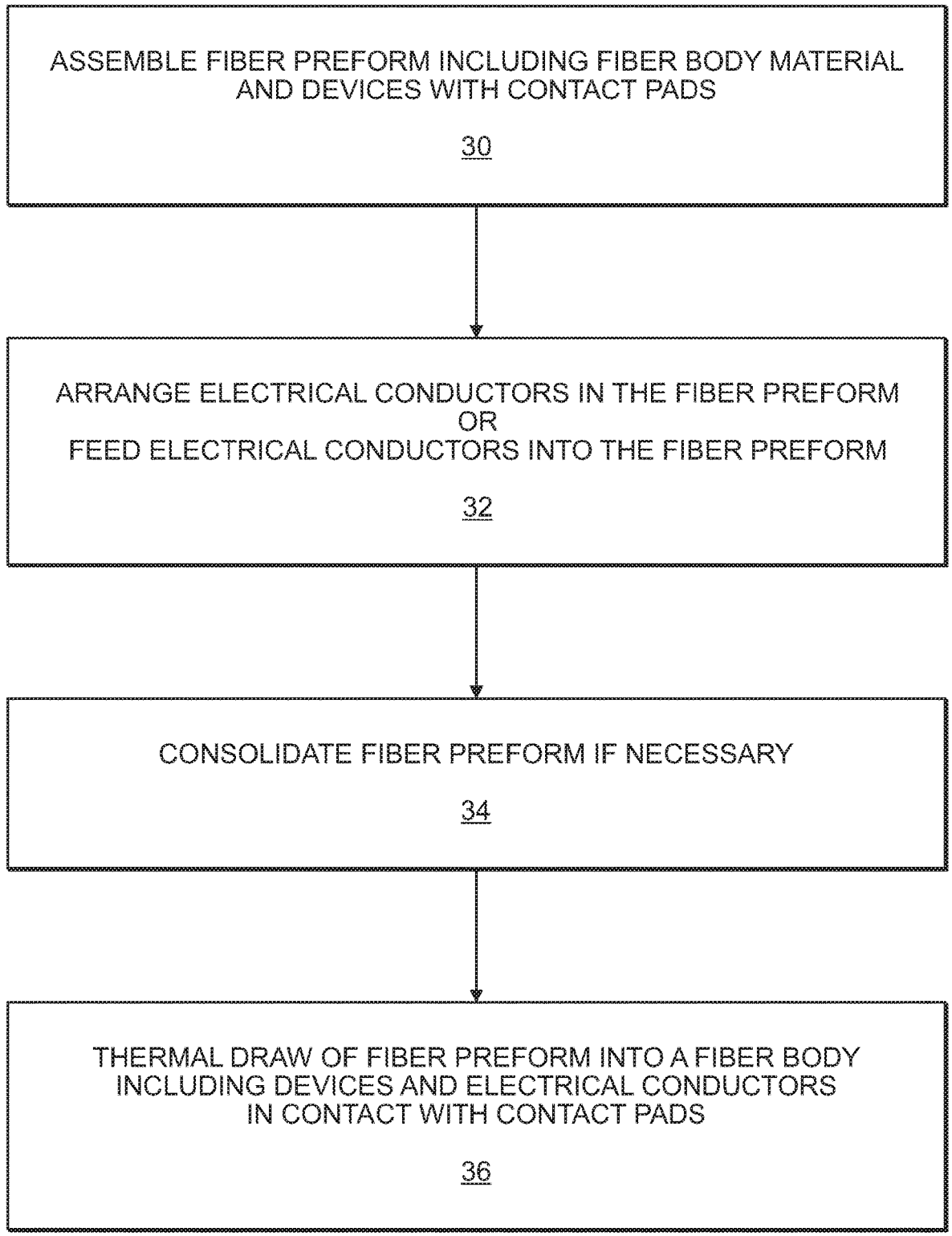
FIG. 2 is a flow chart of steps in a method for thermally drawing the fiber of FIG. 1A.

Referring to the flow chart of FIG. 2, in production of the fiber 10, a fiber preform is thermally drawn into the fiber. Accordingly, in a first step 30 there is assembled a macroscopic fiber preform structure that includes devices. These devices, e.g., microelectronic, photonic, or other devices to be included in the fiber, preferably have or are provided with electrical contact pads, and are arranged with fiber body material in the fiber preform structure. In a next step 32 electrical conductors are arranged in the fiber preform for making electrical contact with the devices in the fiber. These two steps can be accomplished in reverse order or simultaneously. Alternatively, the electrical conductors can be provided for feeding into the fiber preform as the fiber preform is thermally drawn into a fiber.

In a next step 34, the fiber preform is thermally consolidated, if necessary, e.g., to form intimate material interfaces between materials arranged in the fiber preform. As explained below, this consolidation step can be conducted multiple times, e.g., after each of fiber body materials, devices, and conductors are introduced into the preform. Then in a final step 36, the preform is thermally drawn into a fiber having a fiber body within which are disposed devices and electrical conductors in contact with contact pads of the devices. The thermal drawing process produces extended lengths of fiber body material along which are sited rigid devices and along which are provided electrical conductors for operating the devices within the fiber body, all internal to the fiber body.

The fiber body material is provided as any suitable material that can flow at the selected thermal draw temperature. A reasonable criterion for this condition is that the fiber body material flow during the fiber draw by having a viscosity lower than about $10^8$ Poise at the selected draw temperature. For example, given a polymer fiber body material that is arranged to constitute the majority of the fiber preform volume, then a polymer viscosity of between about $10^1$ Poise and about $10^8$ Poise can be acceptable, with a viscosity of between about $10^4$ Poise and about $10^7$ Poise more preferred, all at the selected fiber draw temperature. The fiber body material preferably retains both its structural integrity and its chemical composition at the fiber draw temperature. Although the fiber body material may elongate during the fiber draw, when the fiber body material cools and solidifies, the elemental composition of the material in the drawn fiber is the same as the elemental composition of the fiber body material in the preform.

The fiber body material also preferably encapsulates the rigid devices and contact pads and the electrical conductors disposed along the length of the fiber. With this arrangement, it can be preferred that the fiber body material be an electrically insulating material. The fiber body material is also preferably transparent to wavelengths of radiation of interest, e.g., for operation of photonic or opto-electronic devices within the fiber.

With these considerations, the fiber body material can be provided as, e.g., a thermoplastic polymer, a glass, an elastomer, a thermoset, or other material that can flow during thermal fiber drawing. Conventional fiber cladding materials can be employed as the fiber body material, including, e.g., Polycarbonate (PC), Poly-ethylene (PE), Cyclic Olefin copolymers (COC), Poly-methyl methacrylate (PMMA) or any other acrylic, Polysulfone (PSU), Polyetherimide (PEI), Polystyrene (PS), Polyethylene (PE), Poly-ether ether ketone (PEEK), poly-ether sulfone (PES), or other suitable material. Poly-tetrafluoroethylene (PTFE or Teflon™) and other fluorinated polymers or copolymers can also be employed as fiber body materials in configurations in which their characteristically poor surface adhesion properties can be accommodated. While amorphous polymer materials can be preferred for many applications, it is also recognized that some semicrystalline polymers, e.g., branched PTFE, PE, can be employed as a fiber body material. A necessary condition for any suitable polymeric fiber body material is that there exists a fiber draw temperature at which the polymer can be drawn into a fiber at a reasonable speed, e.g., greater than about 1 mm/minute, without decomposition. The fiber body material can also be provided as silica or any glassy material such as borosilicate glass, chalcogenide glass, or other suitable glassy material.

The devices that are included at sites along the fiber length, within the fiber body, can be microelectronic devices, photonic devices, opto-electronic devices, microelectromechanical devices, or other devices. The devices are fully functional outside of the fiber; that is, the devices do not require the fiber configuration for operation and thus are conventional stand-alone devices, such as a microfabricated microelectronic devices. The devices have one or more operational functionalities, such as light emission, e.g. as a light emitting diode device (LED device), light detection, or other functionality.

Examples of devices included in the fiber are semiconductor devices, electrooptic devices, transistors, diodes, junction-based devices, such as semiconductor junction devices, acoustic devices, and other devices that can be incorporated into the fiber. The devices can be formed of any suitable material, e.g., including II-VI semiconductors, II-V semiconductors, metals, and other materials. The devices can include all of electrically conducting, semiconducting, and insulating materials, including crystalline materials such as monocrystalline and polycrystalline materials, as well as amorphous materials. The devices can be two-terminal devices, three-terminal devices, or other device configurations.

The devices can be conventional commercial devices of any selected material. For example, there can be included in the fiber InGaN devices, such as commercial InGaN LED devices, e.g., blue LED Part number C460UT170-0014-31, from Cree Optoelectronics, Inc., Durham, N.C., having dimensions of 170 μm×170 μm×50 μm, with electrical contact pads provided on opposite sides of the device; and green LED Part number C527UT170-0108-31, from Cree Optoelectronics, Inc., Durham, N.C. A further example of a commercial microelectronic device that can be incorporated into the fiber is a silicon photodiode, Part PD-1016, from Three Five Materials Inc.; New York, N.Y., having dimensions of 400 μm×400 μm×305 μm. Additional example commercially-available devices that can be included within the fiber body include GaAs P—I—N diodes and photodetectors such as Part No. SPD2010, from Broadcom, Ltd., San Jose, Calif., having dimensions of 275 μm×275 μm×150 μm; InGaAs P—I—N diodes and photodetectors such as Part No. LPD2010, from Broadcom, Ltd., San Jose, Calif., having dimensions of 275 μm×275 μm×150 μm; LEDs such as Part No. TCO-07UOR, from Three Five materials, Inc., New York, N.Y.; Si photodiodes such as Part No. PD-30027A-B, from Three Five materials, Inc., New York, N.Y., having dimensions of 700 μm×700 μm×220 μm; and laser diode chips, such as Part number TCU-LD-1310, from Three Five Materials, Inc., New York, N.Y., and Part number TCU-LD-636 from Three Five Materials, Inc., New York, N.Y., both having dimensions of 250 μm×250 μm×11.0 μm.

Whatever devices are to be included within the fiber, it can be preferable that most, if not all, components, regions, materials, and structures of the devices do not flow during the thermal draw of the fiber preform into the fiber, and it is preferable that the entire device withstand the temperature and mechanical stress of a thermal fiber draw process. Semiconducting, conducting, and insulating materials all can be included in the devices. The device materials can exhibit morphologies that are polycrystalline, monocrystalline, amorphous, or some combination of morphology or microstructure. But the devices do not melt or change their dimensions to any substantially extent during the thermal fiber draw process. In one example, this condition requires that at least some or all device components and/or materials have a viscosity, at the selected fiber draw temperature, that is much greater than the viscosity of the fiber body material at the selected fiber draw temperature; a viscosity that is greater than about 10 Poise characterizes this high-viscosity condition of the devices.

The extent of each device in the fiber is less than the cross-sectional extent of the fiber; in other words, the devices sited along the fiber are completely encapsulated by the fiber body material and do not protrude from the fiber surface. Because the thermal draw conditions can be adjusted to control fiber body diameter, a wide range of device sizes can be accommodated to meet this requirement. The devices do not reside on the surface of the fiber and do not employ fiber surface materials. The term 'fiber body' is accordingly herein used to refer to a fiber material that encapsulates the devices within the fiber.

The devices include or are provided with electrical contact pads, e.g., disposed in the fiber preform, to enable electrical connection to the devices for achieving the intended device operational functionality once the fiber is drawn. In one preferable configuration, the devices are sited along the fiber length within the fiber body in a spatial orientation such that contact pads of the device are exposed on one or more device surfaces that are parallel to the longitudinal sidewall surface of the fiber, in the manner shown in FIGS. 1A-B. With this configuration, electrical conductors disposed along the length of the fiber within the fiber body can make contact with device contact pads along the fiber length. The electrical contact pads can be disposed all on one physical plane of the device, on opposing sides of the device, as shown in FIGS. 1A-1B, or on adjacent sides of the device, in any convenient configuration. The contact pads should be electrically conducting and should have a lateral extent that is similar to the extent of the electrical conductor to be employed for making contact to the device.

In one example, contact pads have a diameter of about 80 μm. There are few commercial devices that contact pads smaller than about 80 μm, since conventional wire bonding cannot make connections to much smaller pads. The fiber configuration is not limited necessarily by this technology, but it can be more difficult to form a contact if the size of the contact pad is extremely small. The device contact pad material can be in a molten state or can be not molten during the fiber draw. Contact pad material can be of any suitable composition, such as gold, copper, aluminum, silver, or any suitable combination of metals in the conventional arrangement for commercial microelectronic devices, or a solder-based material such as Bi—Sn, Pb—Sn, or other suitable material. Any suitable contact pad material can be employed, so long as the electrode material to be employed in concert with the contact pad material is considered, so that possible corrosion of the two dissimilar materials is prohibited. Preferably the contact pad material does not include and is not coated with an electrically insulating material that could prohibit electrical connection between the contact pad and an electrical conductor.

The electrical conductors disposed in the fiber for making electrical contact to the device conducting pads can be provided of materials that co-flow with the fiber body material at a common fiber draw temperature, or can be provided of materials that do not flow at the fiber draw temperature. In either case, the conductors are electrical conductive connection media. For materials that do co-flow with the fiber body material, the electrical conductors are preferably formed of a material or materials that melt at the fiber draw temperature. Here, low melting-temperature metals such as Bi—Sn alloys, In-based alloys, Sn—Pb alloys, or any other suitable conducting materials, preferably that are liquid at a selected fiber draw temperature, can be employed.

In this scenario, the electrical conductor material is arranged in the fiber preform configuration so that the conductor material makes electrical contact with device contact pads during the fiber draw, as explained below. To facilitate this electrical connection during the fiber draw, the electrical conductors can be disposed in the fiber preform adjacent to an electrically conducting polymeric composite material, which in general has a low viscosity at a range of fiber draw temperatures. Such a composite can be provided as, e.g., carbon black or other conducting filler that is loaded with a thermoplastic polymer to form, e.g., conducting polycarbonate (CPC), conducting polyethylene (CPE), or other suitable material. Such polymeric conductors are good transversal conductors, and therefore can form an electrically conducting bridge between a metallic conductor material and a device contact pad, but have relatively high electrical resistance, rendering them ineffective for long-distance longitudinal conductivity along the length of a fiber.

For electrical conductor materials that do not flow during thermal fiber draw, electrical contact between device contact pads and solid wires can be achieved by feeding wires into the fiber during the fiber draw. These wires can be made of, for example, a metallic material, preferably in a wire form, ribbon form, or other suitable geometry. The wires that are fed into the fiber preferably do not melt during the fiber draw. Example suitable wire materials include W, Cu, Fe, Al, Ti, Cr, Ni, Au, Ag or any other alloys of these materials. In general, any conductive material, including metallic materials, but also including electrically conductive organic and inorganic materials, can be employed. For example, indium tin oxide, lanthanum-doped strontium titanate, yttrium-doped strontium titanate, polyaniline, polypyrrole, PEDOT: PSS, and other materials can be employed.

Whatever material is selected for electrical conductors, the selected material preferably demonstrates sufficient conductivity and mechanical strength and is the correct size for the fiber configuration. Wires, ribbons, or other structures to be employed as electrical conductors in the fiber preferably do not include an insulating surface layer and preferably can withstand the mechanical stress of the thermal draw process.

For any electrical conductor material provided within the fiber, the electrical conductors preferably exist along at least a portion of the fiber length, and more preferably exist along the entire length of the fiber, connected to the devices along the fiber length. To make the electrical connection from the electrical conductors within the fiber to electrical elements that are external to the fiber, such as a voltage source, current source, sensing circuit, or computational element, the wires are exposed from the encapsulating fiber body material at an end of the fiber, in a manner similar to that employed conventionally for exposing electrical wires that are coated in outer insulation layer, or any method suitable for exposing wires in fibers or cables, e.g., by cutting, chemical dissolution and removal, plasma and laser etching, or other suitable method.

Where electrical conductors extend along a fiber length connected to device contact pads along the fiber length, the devices are electrically connected in parallel along the fiber length. For example, LED devices sited along a fiber length and each connected to electrical conductors along the fiber length are connected in parallel along the fiber length. Two, three, four, or more electrical conductors can be provided along the fiber length, within the fiber body. Thus, devices having more than two electrical terminals, e.g., transistors, can be operated while disposed within the fiber.

The devices sited along the length of the fiber are discrete and can be operable separately or can be operable collectively. As shown in FIG. 1A, there exists a region of fiber body material between adjacent devices, along the fiber length, in which no device exists and only fiber body material exists along with electrical conductors and other fiber components that are not the adjacent devices. Further, a device within the fiber body does not extend around the circumference of the fiber body; the device materials do not form a closed loop around the fiber circumference. Each device is a discrete planar element that can be oriented in a selected manner, e.g., aligned with the longitudinal axis of the fiber body.

The fiber can include a plurality of different devices. For example, one fiber can include along the fiber length separate light emitting devices, light sensing devices, transistors, and other electronic devices, as well as different optical devices, each at a selected site along the fiber length. Electrical conductors can be positioned in the fiber body so that electrical connection is made separately to each type of device or to a plurality of device types. As a result, a plurality of electrical conductors can be included in the fiber and arranged to make connection with contact pads of a selected device or devices in a plurality of devices included in the fiber.

In addition to devices that are included in the fiber preform for incorporation into the fiber, the fiber can include devices that are formed of preform materials during thermal drawing of the preform materials into the fiber. For example, by incorporating electrically conducting, electrically insulating, and/or electrically semiconducting materials in a selected arrangement in a fiber preform, there can be formed electronic, optical, and optoelectronic devices disposed through the cross section and along at least a portion of the length of the fiber, during the thermal fiber draw. Such devices can be designed, arranged and formed by fiber drawing in the manner taught in U.S. Pat. No. 7,295,734, issued Nov. 13, 2007; U.S. Pat. No. 8,863,556, issued Oct. 21, 2014; and U.S. Pat. No. 7,292,758, issued Nov. 6, 2007; the entirety of each of which is hereby incorporated by reference.

The fiber can include a solid core region or a hollow core region, and can include multiple cores, each with a different function and formed of different materials, or can be hollow. The fiber can transmit optical and electrical signals separate from signals produced by devices in the fiber, and can deliver optical and electrical signals. For example, optical transmission elements and/or electrical transmission elements can be included along the fiber length, within the fiber body.

Figure 3:
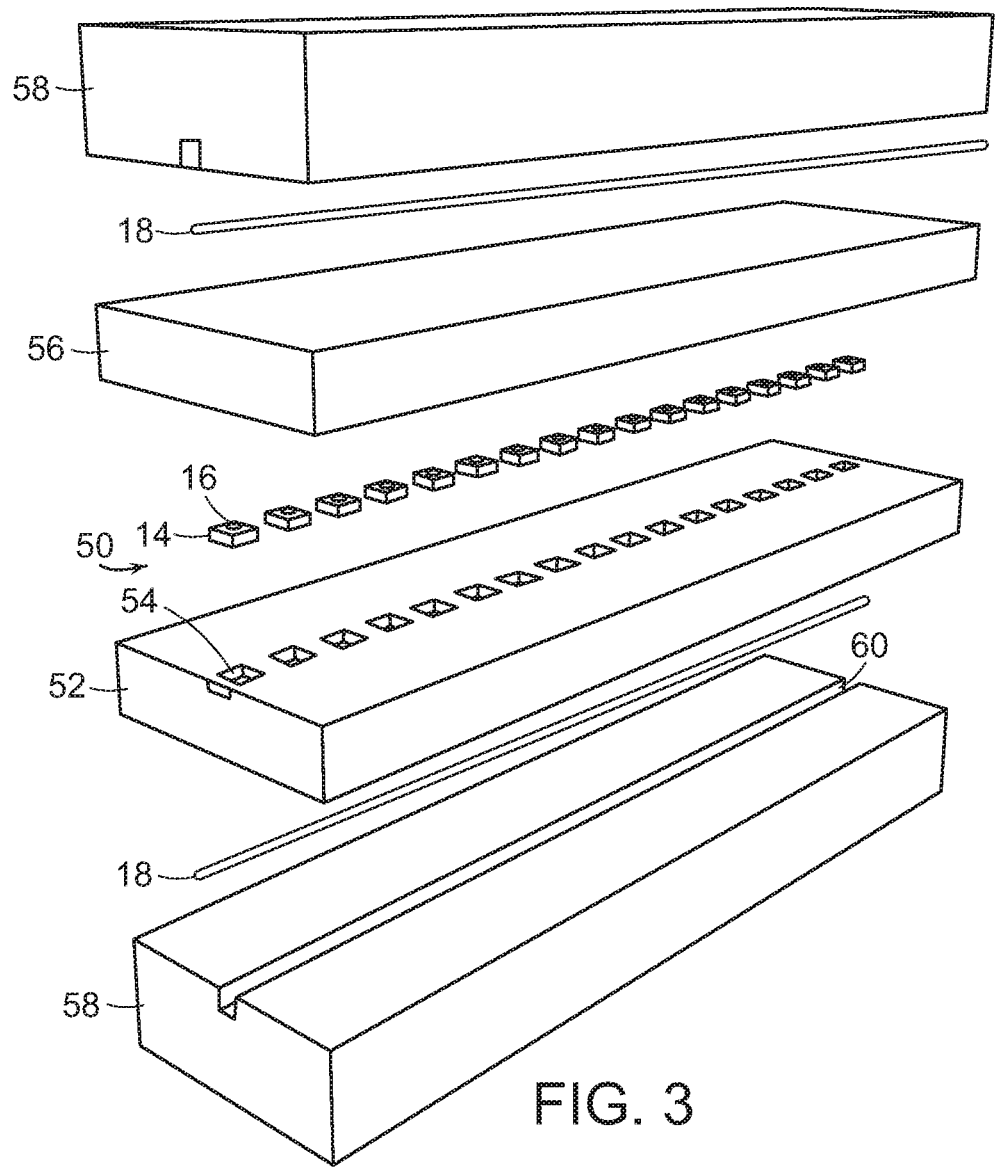
FIG. 3 is an exploded schematic view of the components of a preform for producing the fiber of FIG. 1A.

Referring to FIG. 3 there is shown in exploded view a fiber preform configuration for producing the fiber of FIGS. 1A-1C. There is provided a plurality 50 of microfabricated devices 14 to be included in the thermally-drawn fiber. Each device includes electrical contact pads 16 for making electrical contact to the device when encapsulated in the fiber body material. In FIG. 3, a contact pad is shown on the upper surface of the devices; a second contact pad is also disposed on the lower surface of the devices. A device orientation layer 52 is provided with topology for accepting and orienting one or more devices in the fiber preform. In one example, shown in the figure, the device orientation layer 52 includes pockets 54 for devices 14, each pocket having an extent that is slightly larger than the planar extent of a device, and having a depth that is slightly deeper than the height of a device. This slotted or grooved topology is not required but can be helpful for orienting the plurality devices to achieve positioning of the devices within the drawn fiber at intended device sites along the fiber length. It can be preferred to arrange each device in the device orientation shown in FIG. 3 so that the devices' planar componentry is parallel to the longitudinal axis of the fiber. This configuration is advantageous for enabling an arrangement of electrodes along the fiber length for making electrical connection to the devices, as explained above. A separation layer 56 is arranged for positioning on the devices on the device surface opposite that to be fitted in the device orientation layer 52.

If the electrical conductors to be included within the drawn fiber are formed of material that melts during the thermal fiber drawing, then the electrical conductors 18 are provided in the preform for making electrical connection to the upper and lower contact pads of each of the devices in the fiber. A conductor orientation layer 58 is provided for each conductor 18 with a groove 60 for accepting and orienting the conductor 18. While two conductors are shown in the example of FIG. 3, any number of conductors can be included, each with a separated groove 60 for orienting that conductor. The grooves are configured and sized based on the geometry of the conductors 18 to be embedded in the fiber with the devices for making electrical connection to the devices.

FIGS. 4A-4C show top, side, and bottom views, respectively, of an example commercial device 14 that can be included in a fiber by way of a preform like that of FIG. 3. The example device 14 here is a LED device having a device anode on the top surface and a device cathode on the bottom surface for configuration in the preform arrangement of FIG. 3. Note that the LED device is shown to be a planar device in which the thickness of the device plane is much less than the width or length of the device. In other words, the planar device dimension is greater than the vertical dimension. This is a preferred configuration for any device to be included in the fiber. As with any device included within the fiber, the LED device is fully functional and can perform an intended operation with power supplied to the device; the device is not simply a microelectronic material or group of materials, and is not a particle or arrangement of particles, but rather, is a configuration of device components that together function to perform an intended device operation. Having a planar structure, the device is for many applications preferably oriented in a fiber with the device plane aligned along the longitudinal axis of a fiber, with device contact pads oriented toward sidewalls of the fiber.

Referring to FIGS. 5A-5G, there are shown steps in a method for assembling a preform with the components shown in FIG. 3. In a first step, shown in FIG. 5A, one or more conductor orientation layers 58 are milled to define one or more grooves 60 in the layers. Then electrical conductors 18 are inserted in the milled grooves as shown in FIG. 5B. One or more device orientation layers 52 are then disposed on one or more of the conductor orientation layers 58 and the structure is thermally consolidated, as shown in FIG. 5C. The device orientation layer 52 is then milled, as shown in FIG. 5D, to form grooves 54, as shown in FIG. 3, for devices 14. Devices 14 are then inserted in the grooves 54, as shown in FIG. 5E. Then as shown in FIG. 5F a spacer layer 56 is disposed over the device orientation layer. The entire structure is then consolidated, resulting in the completed preform 65 shown in FIG. 5G. In the conventional manner, a thin cladding layer can be wrapped around the preform assembly prior to the final consolidation step at FIG. 5F.

In this example process, devices and electrical conductors are positioned in a preform arrangement. But this example is not meant to be limiting. As explained above, other materials as well as other components can be included in the fiber preform. The fiber preform can be arranged to include any suitable semiconducting, electrically insulating, and electrically conducting materials in a configuration of electrical and/or optical devices and/or transmission channels or in a configuration that forms electrical and/or optical devices during the fiber draw. The preform can have a circular, rectangular, or other thermally-drawable cross-sectional geometry. A fiber cladding layer can be deposited, wrapped, or otherwise applied to the surface of the preform arrangement. Other surface materials, including jacket materials, can be included as-desired for a given application.

As shown in FIG. 5G, in the assembled preform 65, device contact pads are spaced apart from electrical conductors. The device contact pads do not make electrical or mechanical connection with other devices or with the electrical conductors in the preform. The material composition and thicknesses of the device orientation layer 52, the spacing layer 56, and the conductor orientation layers 58 in the fiber preform are selected so that for given fiber draw process conditions, the devices push through the device orientation layer 52 and the spacer layer 56 during the draw process to make contact with the electrical conductors in the drawn fiber. The electrical connection between devices and electrical conductors is thereby achieved during the thermal fiber draw step, as the fiber preform is reduced to a fiber.

As explained above, material selected as a fiber body material has a viscosity that allows the material to flow at the fiber draw temperature. In the example here, the electrical conductors 18 are also formed of a material that also flows at the fiber draw temperature. Given that the orientation and spacer layers in the preform consist of fiber body material that flows during the draw process, then these layers undergo a reduction in lateral size and undergo axial elongation in the draw process, while the devices retain their shape. And because the devices are much more rigid than the other preform materials, the devices can push on and through the preform materials that do flow and scale down. As a result, if the viscosities of the devices are high enough, the device orientation layer and the spacer layer will be punched through and electric contact between device contact pads and electrical conductors will form. Thus, it is preferred that the fiber cladding material, the orientation layers, the spacer layer, electrical conductors, and other layers that are intended for the fiber body have a viscosity that is lower than about $10^8$ poise at the drawing temperature. Conversely, the devices preferably have a viscosity that is higher than $10^8$ poise at the drawing temperature.

The orientation layers, spacer layers, fiber cladding, and other fiber preform layers that are to flow during the fiber draw can be provided as, e.g., a polymeric material such as Polycarbonate (PC), Poly-ethylene (PE), Cyclic Olefin copolymers (COC), Poly-methyl methacrylate (PMMA) or any other acrylic, Polysulfone (PSU), Polyetherimide (PEI), Polystyrene (PS), Poly-ether ether ketone (PEEK), poly-ether sulfone (PES), Poly-tetrafluoroethylene (PTFE or Teflon™) or any other suitable material. The orientation layers and spacer layers should co-flow with any cladding material during fiber draw. The fiber body 12, shown in FIGS. 1A-1B results from these layers and cladding, and all these materials have similar viscosities which allow them to be co-drawn together at the chosen drawing temperature. The electrical conductor material preferably melts at the drawing temperature, and is provided as, e.g., one of Bi—Sn alloys, In-based alloys, Sn—Pb alloys, or other suitable material.

To facilitate connection between the electrical conductors and device contact pads, there can be included in the preform, adjacent to the electrical conductors, a layer, film or stripe of a polymeric composite material, which has low viscosity at the draw temperature. Such can be provided as, e.g., carbon black, or another filler that is loaded with a thermoplastic polymer such as electrical conducting polycarbonate (CPC), conducting polyethylene (CPE), or other suitable electrically conducting material such as conductive ceramic particles, conductive organic particles, or metallic particles. These polymeric conductors are good transversal conductors, and therefore can aid in formation of an electrically conducting connection bridge between a device contact pad and an electrical conductor, but have relatively high electrical resistance, rendering them ineffective as long-distance axial conductors along the length of a fiber. The conducting polymeric layer then forms an electrical contact between a device contact pad and an electrical conductor by redistribution of materials at the interface of the contact pad when the device and conducting polymeric layer push through the device orientation layer.

In the process steps shown in FIGS. 5A-5G, electrical conductors 18 are arranged in a preform 65 prior to final consolidation of the preform. This example methodology is not required and in some applications, may not be preferred. Electrical conductors can be incorporated into the preform in alternative methods. In one example, a preform like that of FIG. 3 is first assembled with devices 14 and fiber body material provided as one or more device orientation layers including topology for orienting electrical conductors within the fiber preform. But electrical conductors are not inserted in the preform prior to consolidation of the preform. The preform grooves provided for orienting electrical conductors can be filled with a selected spacer material, such as PTFE, during the consolidation step to maintain open grooves.

Figure 6:
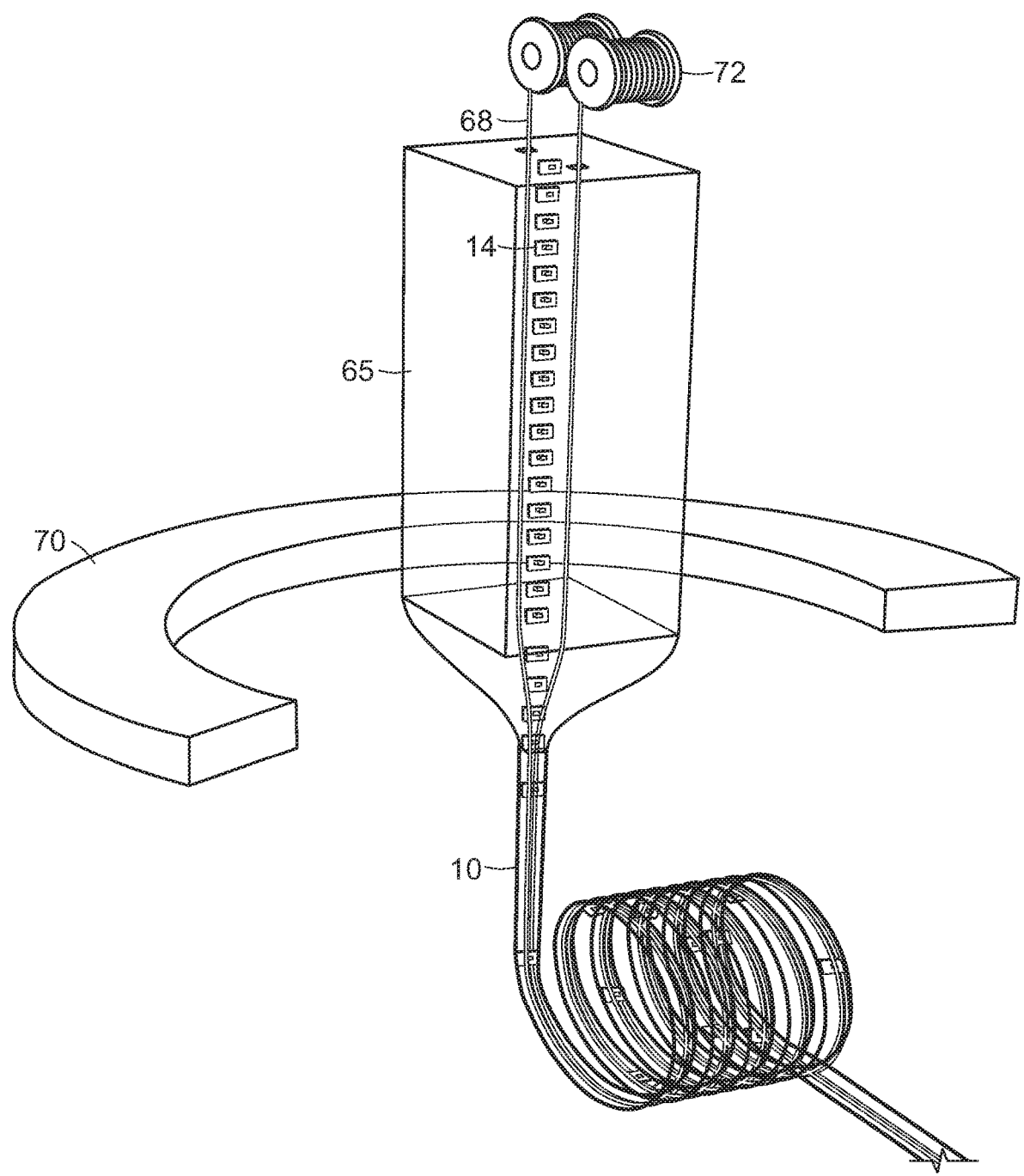
FIG. 6 is a schematic perspective view of a fiber preform being thermally drawn into a fiber including devices, with wires being added to the preform during the thermal drawing.

Then, as shown schematically in FIG. 6, electrical conductors such as ribbon or wire 68 a shown can be fed into the consolidated preform 65, after consolidation and spacer removal, and more specifically, can be fed into the open preform grooves as the preform is fed into a fiber draw tower, shown schematically here as a heating zone 70. One or more spools 72 can be employed to provide the wire 68 for introduction into the preform. Wires to be fed into a preform to be employed as electrical conductors preferably do not include a surface insulation layer and can withstand the mechanical stress of the thermal draw process.

Figure 7:
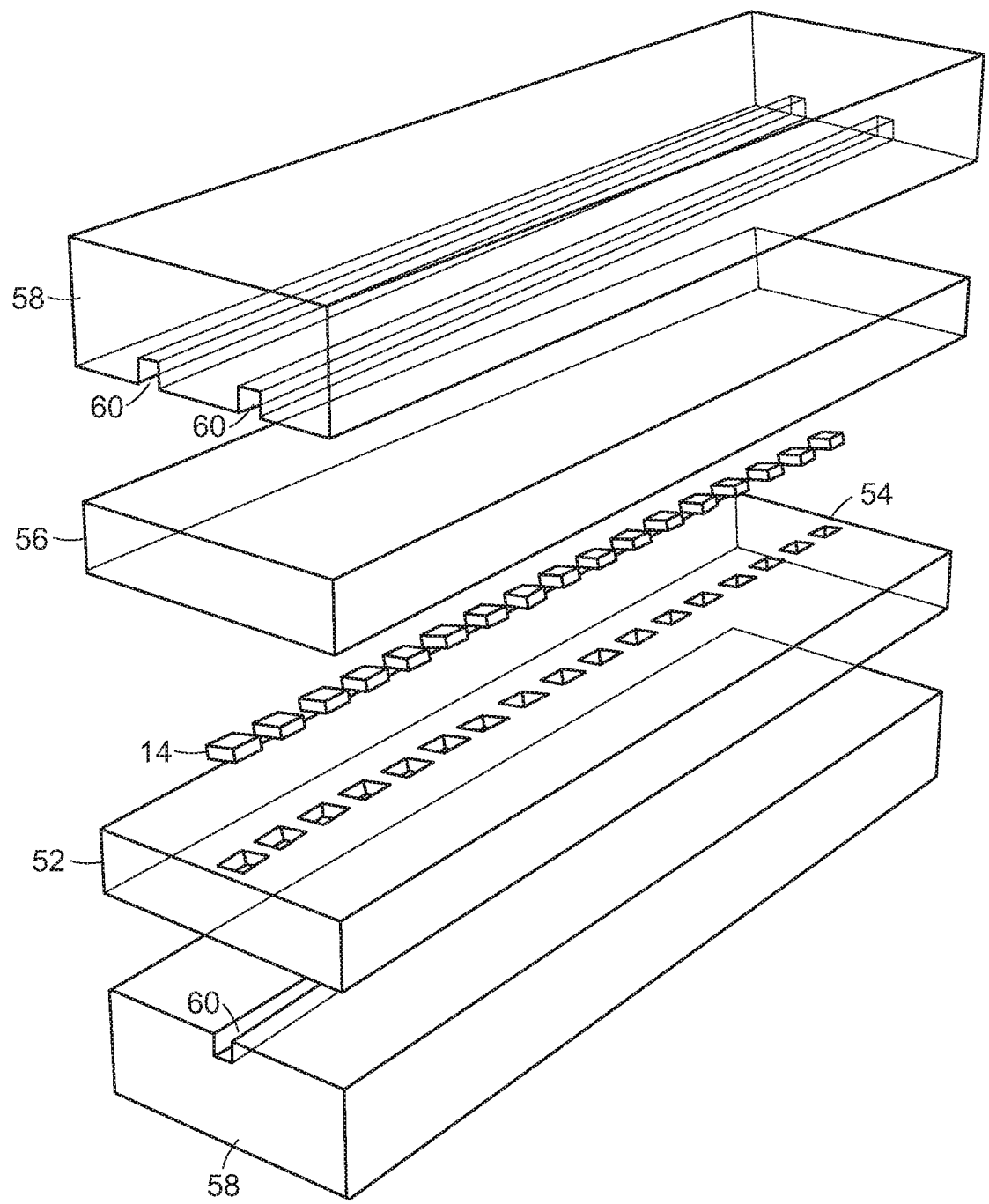
FIG. 7 is an exploded schematic view of the components of a preform for producing a fiber including devices and three electrical conductors therein.

Referring also to FIG. 7, a preform can be arranged to incorporate any number of wires introduced into the preform. For example, as shown in FIG. 7, there can be included three grooves 60 for incorporating three separate wires within a fiber preform as the preform is fed to a draw tower. In the example of FIG. 7, the devices 14 in the preform are three-terminal devices having two contact pads on one planar face of the device and having one contact pad on the opposing planar face of the device. A device orientation layer 52 includes grooves for orienting the devices, and a spacer layer 56 is included adjacent to the device orientation layer 52.

In one example of wire fed into a preform, round W wire, having a diameter of about 50 μm, is employed as the material of electrical conductors within the fiber. In this example, a wire orientation groove in the preform can be, e.g., 1.25 mm-wide and 1.65 mm-deep, all preform long. The wire diameter is preferably greater than the extent of the groove that will result in the drawn fiber. During the fiber draw, as the wire is fed into the preform, the wire fills the groove in the preform. Having a diameter greater than that of the groove, the wire pushes through the device orientation layer and the spacer layer, to make an electrical connection with device contact pads. The rigid devices also push through preform material in the manner described above, cooperating in a process for making connection with device contact pads.

Preferably, the fiber parameters, e.g., viscosity of the orientation layer and spacer layer material, are controlled so that the wire does not push so far through the layers to form an electrical short with the wire on the opposite side of the fiber. There are several ways to prohibit this condition, e.g., control of wire size, control of groove extent, control of fiber draw speed, draw temperature, and control of preform material viscosity, all of which control the characteristics of the final structure of the fiber. If the grooved preform layer and spacer layer are of the same material as the fiber cladding e.g., PC, then wires can effectively make electrical contact with device contact pads without forming an electrical short. Thus, the viscosity of the preform spacer layer should be suitable to allow the wires to only partially cut through this layer.

Whatever methodology is employed for introducing electrical conductors into a preform, the devices are preferably arranged within the preform in a sequence of devices having a linear density that produces a corresponding desired linear device density in the drawn fiber. The linear distance between devices in the fiber is proportional to the square of the draw down ratio for a given fiber drawing process. During the fiber draw, the preform is vertically fed through the drawing zones with a selected feed speed, for example, about 1 mm/min, and a selected draw speed, for example, 1.6 m/min. The ratio of the feed speed to the draw speed sets the fiber draw down ratio. For example, these feed and draw speeds result in a draw down ratio of forty, meaning that all lateral dimensions of the preform are decreased by a factor of forty in the fiber, while all axial distances of the preform are increased by a factor of 1600 in the fiber. The distance between adjacent devices in a preform is therefore in this example increased by a factor of 1600 in the drawn fiber. It is recognized, therefore, that for some applications it can be preferred to optimize fiber drawing conditions to enable a reduction in fiber draw down ratio, and corresponding reduction in distance between devices along the fiber length, while maintaining necessary mechanical and thermal drawing parameters.

In addition, or alternatively, devices can be arranged in a preform in any suitable fashion that can aid in obtaining a desired linear device density in a drawn fiber. The example preform arrangements shown in FIG. 3 and FIG. 5 are not meant to be limiting. For example, the distance between adjacent devices within the preform can be any suitable distance, e.g., with devices placed as far apart as desired, or place immediately adjacent to each other.

In addition, device density control can be achieved by arranging devices in a preform in two or more layers, horizontally and/or vertically, with electrical conductors and spacer layers arranged accordingly. In other words, two or more sequences of devices can be included in the preform, either across a layer or in stacked layers. As the number of device layers in the preform is increased, the resulting linear density of devices within the fiber is correspondingly increased.

In one method for achieving this, two or more device layers are arranged in the preform, with a slight lateral mismatch between the sequences of devices in the different layers. This lateral mismatch along the sequences of devices causes all of the devices to be drawn into the fiber in a single linear sequence, at different points along the fiber length, rather than next to each other in the fiber cross section, thus ensuring that no two devices are sited at exactly in the same point along the fiber length. Because a slight lateral mismatch between two sequences of devices in the preform is amplified by the square of the draw down ratio in the fiber, the draw process acts to unstack the devices from the preform layers and to site the devices at different positions along the fiber. A longitudinal mismatch between two or more sequences of devices in the preform of as little as ten microns or less is sufficient to produce a single linear sequence of devices in the fiber. A ten micron-mismatch results in a 16 mm distance between devices for a draw down ratio of forty. As a result, even though two or more sequences of devices may be stacked or spaced apart laterally in a preform, the devices are arranged in a single-file sequence within the resulting drawn fiber.

Figure 8:
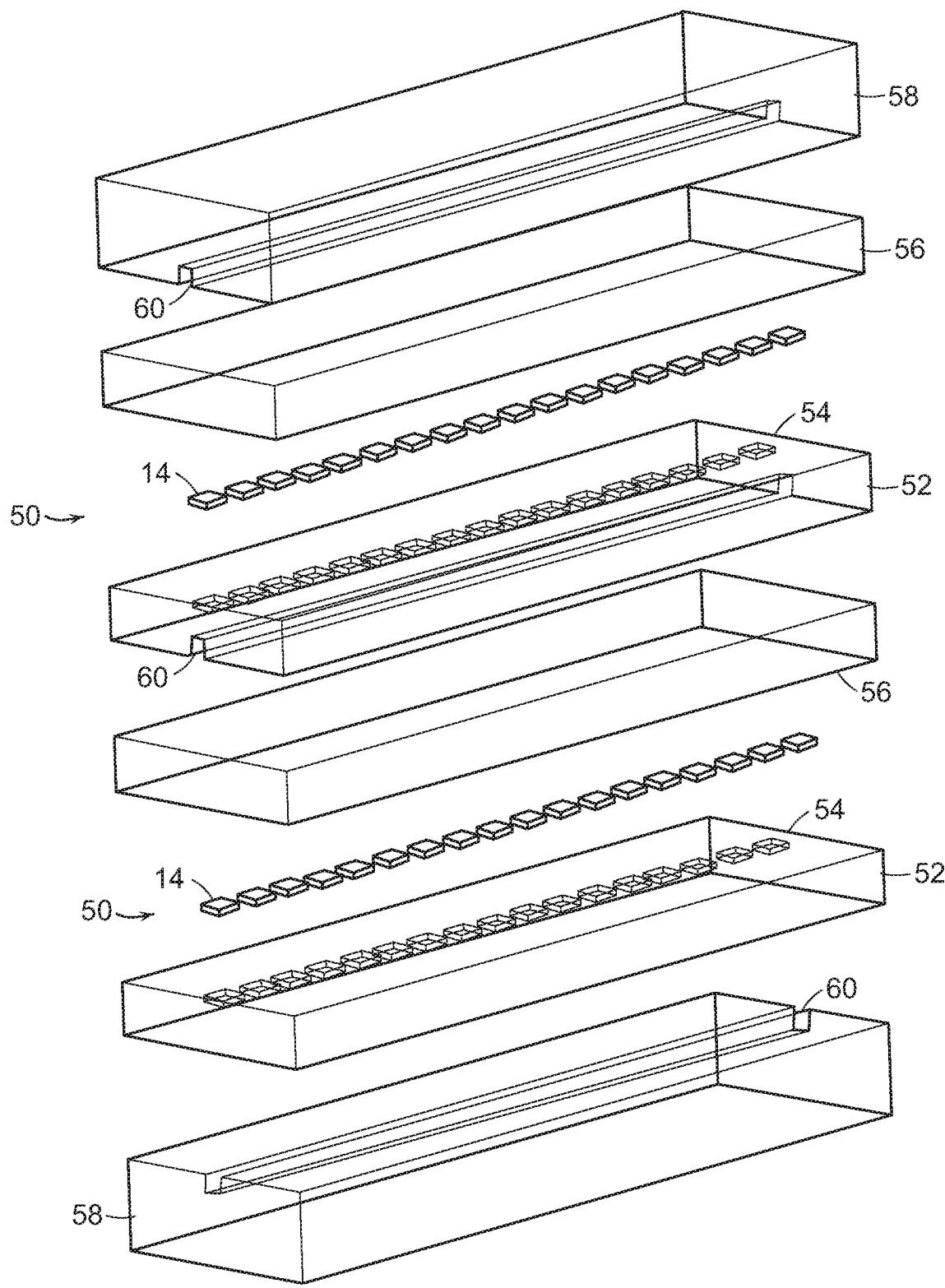
FIG. 8 is an exploded schematic view of the components of a preform including two stacked layers of devices, and grooves for corresponding electrical conductors, for producing a fiber including devices with a reduced distance between adjacent devices along the fiber length.

FIG. 8 is an exploded schematic view of an example preform including two vertical layers of devices for incorporation within a fiber. In this preform two sequences 50 of devices 14 are disposed in grooves 54 in two corresponding device orientation layers 52. Preferably the two lines of devices are offset from each other laterally along the sequences so that the devices are incorporated into the drawn fiber in single-file sequence. Upper and lower preform layers 58 providing grooves 60 for electrical conductors are provided along with an additional groove 60 provided in one of the device orientation layers 52. Two separation layers 56 are here employed.

Figure 9:
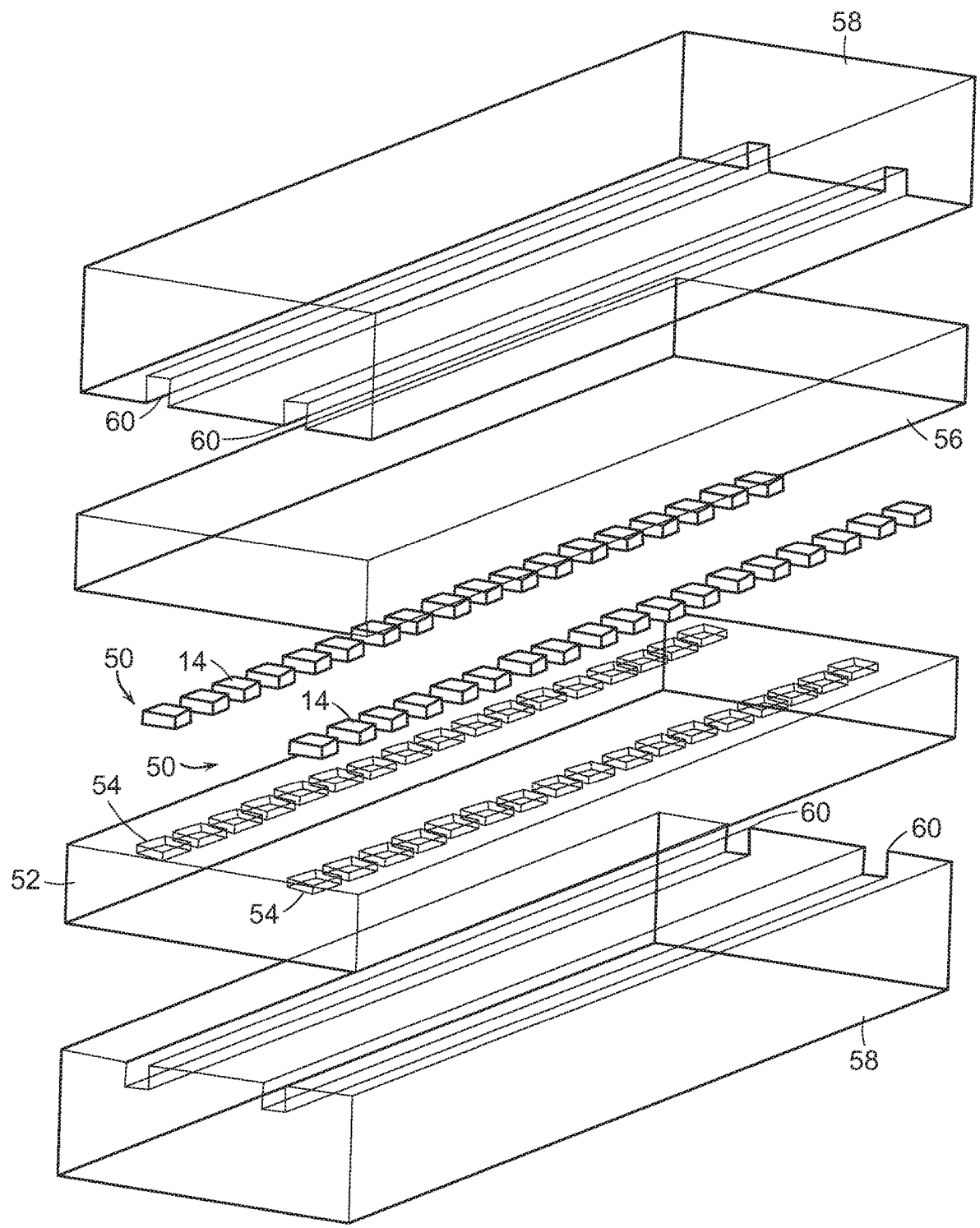
FIG. 9 is an exploded schematic view of the components of a preform including two laterally spaced lines of devices, and grooves for corresponding electrical conductors, for producing a fiber including devices with a reduced distance between adjacent devices along the fiber length.

FIG. 9 is an exploded schematic view of a further example preform including two sequences 50 of devices 14 that are arranged in one common layer of a preform. Here a single device orientation layer 52 includes two lines of grooves 54 for separately orienting the two sequences 50 of devices 14. Preferably the two lines of grooves and devices are laterally offset from each other along the sequences to achieve single-file incorporation of the devices into the drawn fiber. In other words, the devices in one of the sequences of devices is offset along the other sequence of devices. The preform layers 58 providing grooves 60 for electrical conductors here include at least four grooves for receiving four wires, whereby four electrical conductors are included within the drawn fiber along the fiber length.

In one example thermal fiber drawing process, a draw tower is configured in a conventional three-zone draw setup, with, e.g., top zone temperature, middle-zone temperature, and bottom zone temperature each between about 100° C. and about 500° C. The middle-zone temperature should be the highest of the three zone temperatures, and is considered to be a stated draw temperature. One or more drawing zones are sufficient if three are not available. The drawing temperature should be primarily selected based on the fiber body material to be used. For example, the higher the glass transition temperature of the fiber body material to be used, the higher the required draw temperature. Example fiber body materials and corresponding middle-zone fiber drawing temperature ranges are as follows: PC-draw temperature between about 145° C. and about 400° C.; PSU-draw temperature between about 180° C. and about 400° C.; PEI-draw temperature between about 217° C. and about 400° C.; PE-draw temperature between about 1.00° C. and about 400° C.; COC-draw temperature between about 70° C. and about 400° C.; PMMA-draw temperature between about 85° C. and about 400° C.; PS-draw temperature between about 100° C. and about 400° C.; PEEK-draw temperature between about 140° C. and about 500° C.; and PES-draw temperature between about 200° C. and about 500° C. Other fiber body materials and fiber draw temperatures can be employed as-suitable for a given application.

As shown schematically in FIG. 6, during the fiber draw, the preform 65 is vertically fed through the drawing zones 70 with a selected feed speed, for example, about 1 mm/min, and a selected draw speed, for example, 1.6 m/min. The ratio of the feed speed to the draw speed sets the fiber draw ratio, as explained above. For example, for these feed and draw speeds, a draw ratio of 40 is produced, meaning that all lateral dimensions of the preform are decreased by a factor of 40 in the fiber, while all axial distances of the preform are increased by a factor of 1600 in the fiber. These conditions set the final dimension of the drawn fiber. Thus, to obtain a different size of a fiber out of the same preform, the feed and draw speeds are adjusted to produce a selected fiber dimensionality. The tension applied to the fiber during the fiber draw can be, e.g., in the range of between about 10 gr/mm$^2$ and about 800 gr/mm$^2$.

If a solid wire or wires are guided into the preform during the draw, the tension to be used is highly dependent on the turn of the wire spool, given that the spool will oscillate according to the spin of the spool. In the draw, solid wires that are inserted into the preform can be tied to the bate-off weight of the preform. Once the bate-off occurs, the fiber body material clamps around the wires and wires become embedded in the fiber body material. The wires are pulled into the preform from a spool 72 just by the pulling on the fiber through the draw tower, since the wires are embedded inside the fiber and do not slip. No external feeding mechanisms are required, although use of ball bearings or a feeding motor can be employed, if desired, to decrease the stress fluctuation, since there is no dependence on spool spinning intervals.

Example 1

A fiber including LED devices and electrical conductors for making electrical connection to the devices was thermally drawn. First a fiber preform was assembled of fiber body material provided as two polycarbonate (PC) bars as shown in FIG. 4A having a width of about 1", a length of about 8", and a thickness of about ½". A groove 60 having a width of about 1.25 mm and a depth of about 1.65 mm was milled across the length of each bar. A PC device orientation layer, shown in FIG. 5D, having a thickness of about 0.5 mm, was consolidated on top of one of the bars, with Teflon spacers placed inside the electrical conductor grooves during the consolidation, to prevent the device orientation layer material from flowing into the electrical conductor grooves during the consolidation step. The consolidation was conducted in a hot press, at a temperature of 170° C., for 5 minutes. Small round pockets having a diameter of 250 μm and depth of 70 μm were milled in the device orientation layer, spaced 1.25 mm apart. A total of 40 pockets were milled, 80 mm from the preform ends.

Commercial LED devices, Part No. C460UT170 from Cree Optoelectronics, Inc. Durham, N.C., were manually placed in the milled pockets, with the anodes of all devices oriented in the same direction, which was marked on the preform. Forty LED devices were included in the preform, corresponding to the 40 pockets. A PC spacer layer 56 shown in FIG. 5F, of 0.5 mm in thickness, was consolidated on top of the device orientation layer with a 5-minute hot press consolidation. The second PC electrical conductor orientation layer 58 was then consolidated on top of the PC spacer layer together with a thin PC film of about 25 μm in thickness that was wrapped around the entire preform.

The preform was then attached to a guiding rod and placed in a draw tower. Two 50 μm-diameter W wires were guided through the channels in the preform as in the manner shown in FIG. 6. A 32-ounce weight was attached to the bottom of the preform and the W wires that were guided through the preform were tied to the weight. The bate-off of the preform was achieved at the three zone thermal drawing temperature. The top zone temperature was set to 150° C., the middle zone temperature was set to 270° C., and the bottom zone temperature was set to 110° C. After the onset of the bate-off the fiber was guided through a capstan and drawn. The drawing conditions were set with a feed speed of 1 mm/min and a draw speed of 1.6 mm/min. The middle drawing zone temperature was then lowered to 260° C. With these drawing conditions, the drawn fiber diameter was 650 μm, and each rigid LED device in the fiber had dimensions of 170 μm×170 μm×50 μm.

After the draw, a few 5 m-long sections were cut from the fiber, with the remaining length kept continuous. The sites of devices along the fiber sections were located by external examination of the fiber through an optical microscope. After the locating the devices in a fiber section, the two wires in the fiber section were exposed out of the fiber body material at the end of the fiber section using a sharp razor, and were connected with the anode wire to the negative terminal of a diode current driver. A voltage of between about 2.7 V and about 3 V and a current of about 10 mA was supplied to the two wires in a fiber section to light the LEDs in the fiber section. The LED devices in a fiber section demonstrated successful illumination when current was provided to the LED devices through the wires incorporated in the fiber along the fiber length.

Example II

A fiber including high-bandwidth photodetecting P—I—N diode devices and electrical conductors making electrical connection to contact pads of the devices was thermally drawn. Referring to FIG. 7, first a fiber preform was assembled of fiber body material provided as two polycarbonate (PC) bars 58, as shown in FIG. 7, having a width of about 1", a length of about 8", and a thickness of about ½". Two grooves 60 having a width of about 1.25 mm and a depth of about 1.65 mm were milled across the length of one bar, and a single groove with similar dimensions were milled into the surface of the second bar. A PC device orientation layer 52, having a thickness of about 1.5 mm, was consolidated on top of one of the bars, with Teflon spacers placed inside the electrical conductor grooves during the consolidation, to prevent the device orientation layer material from flowing into the electrical conductor grooves during the consolidation step. The consolidation was conducted in a hot press, at a temperature of 170° C., for 5 minutes. Small square pockets having a length and width of 400 μm and depth of 200 μm were milled into the device orientation layer, spaced 0.5 mm apart. A total of 40 pockets were milled, 80 mm from the preform ends.

Commercial high bandwidth, GaAs photodetecting P—I—N diode devices, Part No. SPD2010 from Broadcom, Inc. Irvine, Calif., were manually placed in the milled pockets, with the contacts of all devices oriented in the same direction both in the plane and facing the same direction, which was marked on the preform. Forty devices were included in the preform, corresponding to the forty pockets. A PC spacer layer 56, of 1.5 mm in thickness, was consolidated on top of the device orientation layer with a 5-minute hot press consolidation. The second PC electrical conductor orientation layer 58 was then consolidated on top of the PC spacer layer together with a thin PC film of about 25 μm in thickness that was wrapped around the entire preform. The preform was then attached to a guiding rod and placed in a draw tower.

Three 50 µm-diameter W wires were guided into the three grooves 60 in the preform as in the manner shown in FIG. 6. Two wires were introduced to make electrical connection with the device contact pads and the third was introduced to prevent tilt of the device during fiber draw. A 32-ounce weight was attached to the bottom of the preform and the W wires that were guided through the preform were tied to the weight. The bate-off of the preform was achieved at the three zone thermal drawing temperature. The top zone temperature was set to 150° C., the middle zone temperature was set to 270° C., and the bottom zone temperature was set to 110° C. After the onset of the bate-off the fiber was guided through a capstan and drawn. The drawing conditions were set with a feed speed of 1 mm/min and a draw speed of 1.6 mm/min. The middle drawing zone temperature was then lowered to 260° C. With these drawing conditions, the resulting fiber diameter was 650 µm and dimensions of the devices within the fiber were 275 µm×275 µm×150 µm each.

After the draw, the resulting fiber was cut into several 5 m-long sections with the remaining fiber length being continuous. The sites of devices along the fiber sections were located by external examination of the fiber through an optical microscope. After the locating the devices in a fiber section, the two wires in the fiber section were exposed out of the fiber body material at the end of the fiber section using a sharp razor, and were connected with the anode wire to a Keithly 6487 picoammeter/voltage source and a Keithly 6517 Electrometer.

An optical signal was directed to a fiber section by arranging a fiber including commercial LED devices, Part No. TCO-07UOR, from Three Five Materials, New York, N.Y.; about 5 mm from a photodiode device in the drawn fiber. The voltage applied to the fiber wires was swept between a range of voltages first under dark conditions and then under illumination conditions.

Figure 10A:
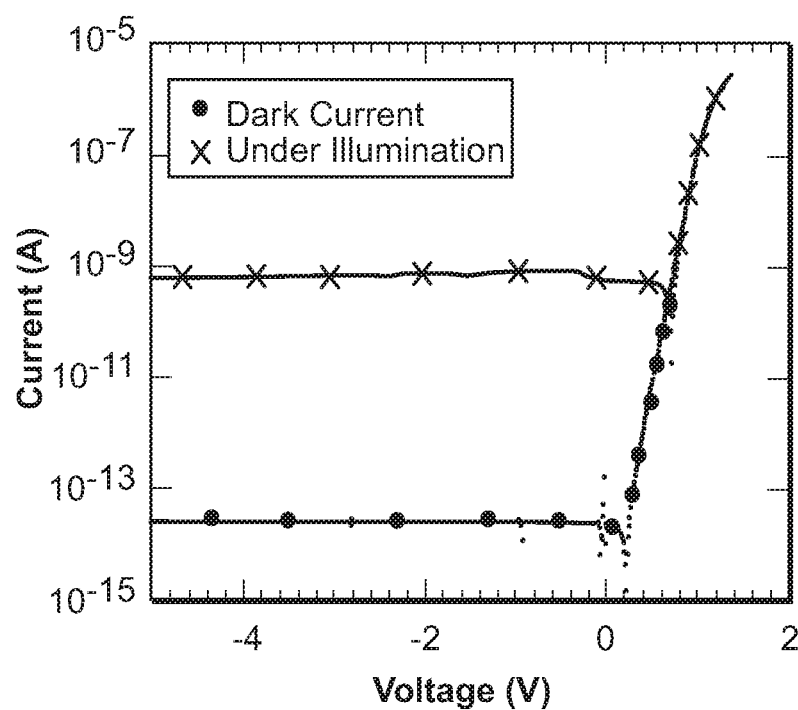
FIGS. 10A-10B are plots of measured device current as a function of voltage, and current amplitude as a function of frequency, respectively, for an experimental fiber including GaAs P—I—N photodetector devices.

The current generated by the fiber devices in converting the impinging optical signal into an electrical signal was transmitted from the devices through the wires embedded in the fibers to the external Keithly 6517 electrometer. FIG. 10A is a plot of measured current from the photodetector devices as a function of voltage applied to the devices within the fiber. The devices were demonstrated to operate successfully under reverse voltage, or without application of any voltage.

Figure 10B:
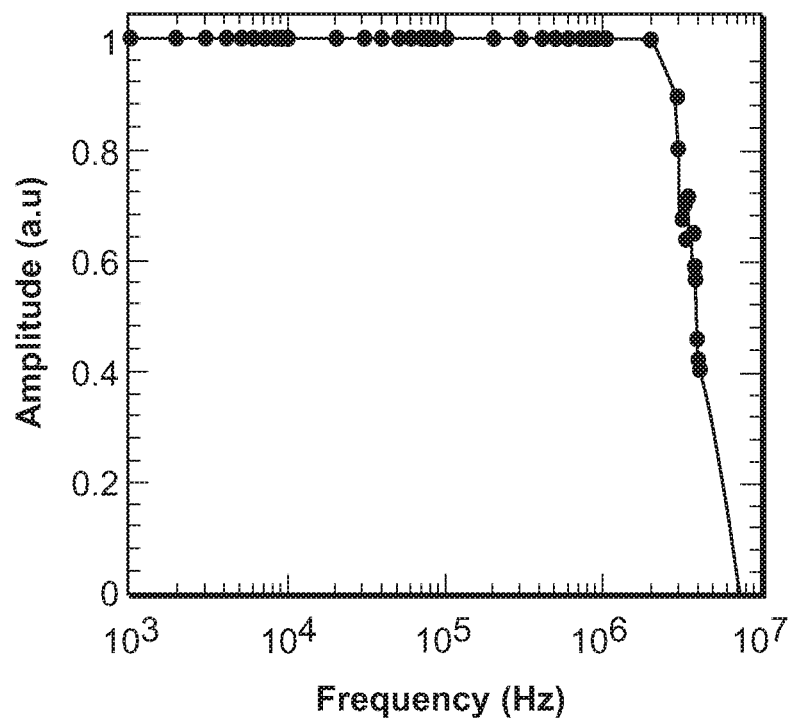

The operational bandwidth of the fiber photodetecting devices was measured using a Tektronix AFG3252 function generator connected to a fiber-pigtailed laser diode, Thorlabs LPM-660-SMA, configured as the illumination source. The electrical conductors of the experimental fiber were connected to a the Thorlabs TIA60 transimpedance amplifier and the Agilent Technologies DSO-X 3014A oscilloscope. The frequency of the laser diode illumination was swept across a range of frequencies as the illumination source was directed to a photodetecting device in the fiber, and the amplitude of the resulting photodiode device voltage was measured with the oscilloscope at each frequency point. FIG. 10B is a plot of measured amplitude as a function of frequency, indicating a detection bandwidth of about 3 MHz. This demonstrates very successful operation of devices within a fiber body.

With the description and examples provided above, it is demonstrated that the methodology provided herein enables independently functional, fully fabricated microelectronic devices such as LEDs, detectors, transistors, and other devices, including commercially-available microelectronic and optoelectronic devices, to be included in a thermally drawn fiber. Any devices in a wide range of micro-scale electronics, such as LEDs and photodiodes, or other microscale devices, e.g., having cross sections on order of 100 microns, which are conventionally available commercially, can be included in the fiber. Such devices are readily commercially available, are inexpensive, and have been optimized for high efficiency performance. The fiber formation paradigm provided herein provides an ability to include the benefits of high performance devices without the need to fabricate the devices from fiber materials themselves. Thus, the fiber formation paradigm provided herein combines the benefits of several technologies, namely, the high-efficiency high-performance of device microfabrication technology and the well-controlled, fiber drawing technology, to produce kilometer-long fibers that can be woven into highly functional fabrics, textiles, and other fiber arrangements for a wide range of communication and sensing applications.

The thermal draw of a fiber including fabricated devices enables the integration of commercial microfabricated microelectronics into fabrics, woven and non-woven textiles, cloth, and other such materials, and presents enormous opportunity to address a wide range of fiber-based applications. Of particular importance is the high mechanical flexibility and the long lengths achieved by the thermally drawn fibers. Even with planar, rigid device structures disposed along a fiber length, the fiber maintains significant mechanical flexibility and thus is a weavable or knittable yarn or textile fiber, meaning that the fiber can be employed in textile fabrication processes, like weaving, that are designed to employ conventional yarns, fibers, filaments, or thread. A fabric can be woven out of many fibers or out of one continuous fiber. Fibers with different devices can be woven together to provide a cloth containing many different devices. "Wearable" electronics thus are truly wearable with the in-fiber microelectronics achieved herein; the electronics-articulated fibers can be woven into fabrics, grids, cloth and textiles in general.

The fiber provided herein can be arranged in any suitable fashion, e.g., woven into an electronic shirt with light emission functionality for safety or fashion, or woven into an electronic fabric with energy harvesting capabilities that incorporate photovoltaic cells into the fabric fibers. Endowing fibers with active devices establishes a new generation of multifunctional fibers, with highly-desired electronic properties. For example, light emitting devices can be integrated with an optical fiber to enable covert, optical signal transmission from fabric in a garment to the external world; different wavelength emitting devices can be employed simultaneously and high-bandwidth photodetectors can be co-embedded to allow two-way transmission and reception of communication between the wearer of the garment and command control, or between two or more fabrics and/or garments. Similarly, the body movement of the wearer of the garment can be monitored, e.g., for virtual reality applications. Further, the fabric and/or garment can be employed as an enabling medium for LiFi to a fabric information transferring system. Here, light is modulated for the transfer information from an external light emitting source to photodetecting fabrics embedded in a garment or other textile-based structure.

The fiber provided herein further can be arranged as a body monitoring device, wherein the fiber, with light emitting diodes and/or photodetectors incorporated therein, is employed to measure body function, such as pulse, by means of photoplethysmography, a blood oxygen saturation measurement (Oxymetry) system. Other fiber applications, such as road illumination with fibers incorporated into pavement for safety and novel design, are enabled by the in-fiber microelectronics provided herein.

It is recognized that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A fiber comprising:
 a fiber body comprising a fiber body material and having a longitudinal axis along a fiber body length;
 a plurality of discrete devices disposed as a linear sequence of devices within the fiber body along at least a portion of the fiber body length, each device including at least one electrical contact pad, said fiber body material including fiber body material regions disposed between adjacent devices in the linear sequence of devices, separating adjacent devices with fiber body material;
 wherein at a common fiber draw temperature, the fiber body material has a viscosity that is less than about $10^7$ Poise and each device within the fiber body has a viscosity that is greater than about $10^8$ Poise; and
 at least one electrical conductor disposed within the fiber body along at least a portion of the fiber body length, the electrical conductor being electrically connected to an electrical contact pad of devices in the plurality of devices within the fiber body.

2. The fiber of claim 1 wherein at a common fiber draw temperature, the electrical conductor has a viscosity that is greater than about $10^8$ Poise.

3. The fiber of claim 1 wherein at a common fiber draw temperature, the fiber body material has a viscosity that is greater than about $10^4$ Poise and that is less than about $10^7$ Poise.

4. A fiber comprising:
 a fiber body comprising a fiber body material and having a longitudinal axis along a fiber body length, the fiber body length being greater than about 50 meters;
 a plurality of discrete devices disposed as a linear sequence of devices within the fiber body along at least a portion of the fiber body length, each device including at least one electrical contact pad, said fiber body material including fiber body material regions disposed between adjacent devices in the linear sequence of devices, separating adjacent devices with fiber body material; and
 at least one electrical conductor disposed within the fiber body along at least a portion of the fiber body length, the electrical conductor being electrically connected to an electrical contact pad of devices in the plurality of devices within the fiber body.

5. A fiber comprising:
 a fiber body comprising a fiber body material and having a longitudinal axis along a fiber body length;
 a plurality of discrete devices disposed as a linear sequence of devices within the fiber body along at least a portion of the fiber body length, each device including at least one electrical contact pad, said fiber body material including fiber body material regions disposed between adjacent devices in the linear sequence of devices, separating adjacent devices with fiber body material, wherein at least one device disposed within the fiber body comprises a crystalline material selected from the group consisting of monocrystalline material and polycrystalline material; and
 at least one electrical conductor disposed within the fiber body along at least a portion of the fiber body length, the electrical conductor being electrically connected to an electrical contact pad of devices in the plurality of devices within the fiber body.

6. The fiber of claim 5 wherein the fiber body material comprises a polymeric, electrically insulating material.

7. The fiber of claim 5 wherein the fiber body material includes at least one material selected from the group consisting of a thermoplastic material, a polyimide material, a thermoset material, a glass material, a polysulfone material, a polycarbonate material, a polymethyl methacrylate material, a polyethylene material, a polyether sulfone material, a polyether ether ketone material, a cyclic olefin copolymer material, and a fluorinated polymer material.

8. The fiber of claim 5 wherein the fiber body material is transparent to at least one wavelength of radiation.

9. The fiber of claim 5 wherein the fiber body has a cross-sectional extent and wherein a ratio of fiber body length to fiber body cross-sectional extent is greater than about 1000.

10. The fiber of claim 5 wherein the fiber body has a cross-sectional geometry that is selected from the group consisting of generally circular, generally elliptical, generally rectangular, and generally triangular.

11. The fiber of claim 5 wherein a cross-sectional extent of the fiber body is greater than a largest dimension of each device disposed within the fiber body.

12. The fiber of claim 5 wherein the fiber body material encapsulates devices and electrical conductors within the fiber body while maintaining electrical connection between the electrical conductors and electrical contact pads of the devices within the fiber body.

13. The fiber of claim 5 wherein at least one device disposed within the fiber body comprises a photonic device.

14. The fiber of claim 5 wherein at least one device disposed within the fiber body comprises a microelectronic device.

15. The fiber of claim 5 wherein at least one device disposed within the fiber body comprises a device selected from the group consisting of diode, photodiode, light emitting diode, laser diode, and photodetector.

16. The fiber of claim 5 wherein at least one device disposed within the fiber body comprises a transistor.

17. The fiber of claim 5 wherein at least one device disposed within the fiber body comprises a semiconductor junction device.

18. The fiber of claim 5 wherein at least one device disposed within the fiber body is a two-terminal electronic device and includes at least two electrical contact pads.

19. The fiber of claim 5 wherein at least one device disposed within the fiber body is a three-terminal electronic device and includes at least three electrical contact pads.

20. The fiber of claim 5 wherein each device disposed within the fiber body is mechanically rigid.

21. The fiber of claim 5 wherein each device disposed within the fiber is spatially oriented within the fiber body such that contact pads of each device are parallel to the longitudinal axis of the fiber body.

22. The fiber of claim 5 wherein each contact pad comprises a contact pad material that is electrically conducting.

23. The fiber of claim 5 wherein the linear sequence of devices along at least a portion of the fiber length includes at least two different devices.

24. The fiber of claim 5 wherein the linear sequence of devices along at least a portion of the fiber length includes at least two devices that are separately operable.

25. The fiber of claim 5 wherein each device disposed within the fiber body is a discrete planar element having a planar dimension that is greater than a vertical dimension of the planar element.

26. The fiber of claim 5 wherein each device disposed within the fiber body has a first planar surface opposite a second planar surface, and wherein a first electrical contact pad is disposed on the first planar surface and a second electrical contact pad is disposed on the second planar surface.

27. The fiber of claim 26 wherein the first and second planar surfaces are oriented parallel with the fiber body longitudinal axis.

28. The fiber of claim 26 wherein at least two electrical contact pads are disposed on at least one of the device first and second planar surfaces.

29. The fiber of claim 5 wherein at least one device disposed within the fiber body comprises an anode and a cathode.

30. The fiber of claim 5 wherein at least one device disposed within the fiber body comprises semiconducting, electrically conducting, and electrically insulating materials.

31. The fiber of claim 5 wherein at least one device disposed within the fiber body comprises a semiconducting material selected from the group consisting of II-VI semiconducting materials and III-V semiconducting materials.

32. The fiber of claim 5 wherein the electrical conductor comprises an electrically conducting wire.

33. The fiber of claim 5 wherein the electrical conductor comprises an electrically conducting material selected from the group consisting of metals and metal alloys.

34. The fiber of claim 33 wherein the electrical conductor comprises a wire including a wire material selected from the group consisting of tungsten, copper, iron, aluminum, titanium, chromium, nickel, gold, and silver.

35. The fiber of claim 33 wherein the electrical conductor comprises an alloy material selected from the group consisting of Bi—Sn alloys, In-based alloys, and Pb—Sn alloys.

36. The fiber of claim 5 wherein the at least one electrical conductor disposed within the fiber body comprises a plurality of electrical conductors each disposed within the fiber body along at least a portion of the fiber body length, each electrical conductor being electrically connected to an electrical contact pad of each device in the plurality of devices within the fiber body.

37. The fiber of claim 36 wherein each electrical conductor in the plurality of electrical conductors is electrically connected to electrical contact pads of different devices in the plurality of devices within the fiber body.

38. The fiber of claim 5 wherein the electrical conductor is exposed at an end of the fiber body length and includes an electrical connection, at the end of the fiber body length, to an external circuit element.

* * * * *